(12) United States Patent
Segel

(10) Patent No.: US 9,554,182 B2
(45) Date of Patent: Jan. 24, 2017

(54) PERSONALIZED VIDEO ENTERTAINMENT SYSTEM

(75) Inventor: Jonathan Dean Segel, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1514 days.

(21) Appl. No.: 13/116,098

(22) Filed: May 26, 2011

(65) Prior Publication Data

US 2011/0231764 A1 Sep. 22, 2011

Related U.S. Application Data

(60) Continuation of application No. 12/337,296, filed on Dec. 17, 2008, which is a division of application No. 10/887,886, filed on Jul. 12, 2004, now Pat. No. 7,627,824.

(51) Int. Cl.

| | |
|---|---|
| G06F 3/048 | (2013.01) |
| H04N 21/44 | (2011.01) |
| H04N 21/234 | (2011.01) |
| H04N 21/266 | (2011.01) |
| H04N 21/2665 | (2011.01) |
| H04N 21/2668 | (2011.01) |
| H04N 21/422 | (2011.01) |

(Continued)

(52) U.S. Cl.

CPC .. *H04N 21/44016* (2013.01); *H04N 21/23424* (2013.01); *H04N 21/2665* (2013.01); *H04N 21/2668* (2013.01); *H04N 21/26616* (2013.01); *H04N 21/42204* (2013.01); *H04N 21/4667* (2013.01); *H04N 21/47202* (2013.01)

(58) Field of Classification Search

CPC combination set(s) only.
See application file for complete search history.

(56) References Cited

U.S. PATENT DOCUMENTS

| | | | |
|---|---|---|---|
| 5,758,259 | A | 5/1998 | Lawler |
| 6,005,561 | A | 12/1999 | Hawkins et al. |
| 6,611,654 | B1 | 8/2003 | Shteyn |

(Continued)

FOREIGN PATENT DOCUMENTS

| | | | |
|---|---|---|---|
| WO | 9747135 | A | 12/1997 |
| WO | 0165862 | A | 9/2001 |

OTHER PUBLICATIONS

Metabyte Personalizes Microsoft TV, Metabyte Networks, Inc., Press Releases, Jun. 14, 1999, 1-2pgs.

(Continued)

*Primary Examiner* — Hien Duong
(74) *Attorney, Agent, or Firm* — Kramer & Amado, P.C.

(57) ABSTRACT

One or more content sequences are created from a store of video content, which could simply be broadcast content which has been captured and stored at a server within a network. The content sequences are generated according to the viewer's specified, or demonstrated, viewing preferences. The viewer preferences are captured form entry by the user themselves, or by observation of their viewing habits. Multiple 'users' per household and multiple content sequences per viewer are possible. A content sequences is then streamed to the viewer, and looks to him/her just like a TV channel: when one program ends, another starts automatically. It is also possible for a viewer to select an item within the content sequence using an interactive program controller.

16 Claims, 3 Drawing Sheets

(51) Int. Cl.
*H04N 21/466* (2011.01)
*H04N 21/472* (2011.01)

(56) References Cited

U.S. PATENT DOCUMENTS

| | | | |
|---|---|---|---|
| 7,089,577 B1 | 8/2006 | Rakib et al. | |
| 7,142,255 B2 | 11/2006 | Nohrden | |
| 7,627,824 B2 * | 12/2009 | Segel | 715/721 |
| 8,650,596 B2 * | 2/2014 | Scott et al. | 725/52 |
| 2001/0047349 A1 | 11/2001 | Easty et al. | |
| 2002/0023021 A1 | 2/2002 | De Souza | |
| 2002/0082901 A1 | 6/2002 | Dunning et al. | |
| 2002/0133830 A1 * | 9/2002 | Kim et al. | 725/142 |
| 2002/0199188 A1 * | 12/2002 | Sie et al. | 725/35 |
| 2003/0067554 A1 | 4/2003 | Klarfeld | |
| 2003/0120748 A1 | 6/2003 | Begeja et al. | |
| 2003/0172378 A1 | 9/2003 | Lalitha et al. | |
| 2004/0025181 A1 | 2/2004 | Addington et al. | |
| 2004/0030599 A1 * | 2/2004 | Sie et al. | 705/14 |
| 2004/0073918 A1 * | 4/2004 | Ferman et al. | 725/34 |
| 2004/0073923 A1 * | 4/2004 | Wasserman | 725/46 |
| 2004/0117829 A1 | 6/2004 | Karaoguz et al. | |
| 2005/0022242 A1 * | 1/2005 | Rosetti et al. | 725/58 |
| 2005/0132067 A1 * | 6/2005 | Bennett et al. | 709/228 |
| 2005/0138659 A1 * | 6/2005 | Boccon-Gibod et al. | 725/58 |
| 2006/0010074 A1 * | 1/2006 | Zeitsiff et al. | 705/52 |
| 2006/0031288 A1 * | 2/2006 | Ter Horst et al. | 709/204 |
| 2006/0045471 A1 * | 3/2006 | Proidl et al. | 386/69 |
| 2006/0080717 A1 * | 4/2006 | Barzilay et al. | 725/100 |
| 2006/0225088 A1 * | 10/2006 | Gutta | 725/14 |
| 2006/0248568 A1 * | 11/2006 | Hamuz-Cohen et al. | 725/132 |
| 2007/0033616 A1 * | 2/2007 | Gutta | 725/58 |

OTHER PUBLICATIONS

Patent prosecution history for U.S. Appl. No. 12/337,296.
Patent prosecution history for U.S. Appl. No. 10/887,886 (U.S. Pat. No. 7,627,824 B2).

* cited by examiner

PERSONALIZED VIDEO ENTERTAINMENT SYSTEM

PRIORITY

This application is a continuation of application Ser. No. 12/337,296, filed Dec. 17, 2008, which is a divisional of application Ser. No. 10/887,886, filed Jul. 12, 2004, the disclosure of which is hereby incorporated by reference.

FIELD OF THE INVENTION

The invention is directed to the field of broadband entertainment and in particular to a system and a method for enabling the convenient delivery of personalized video entertainment.

BACKGROUND OF THE INVENTION

As the consumer electronics migrates from analog to digital technologies and from narrowband to broadband networks, the value of the business models that incorporate software and services is growing relative to the value of business models based on hardware alone. This shift towards services has already taken place in the computer world; it is now emerging in the TV world with development of technologies that enable digital TV.

There are various ways to deliver video content to viewers, depending on the consumer hardware interface (personal computer or TV set) and the type of access network. Thus, video content may be delivered today using data broadcasting (for example via satellite or UHF/VHF wireless), two-way broadband networks (e.g. Via DSL lines), and two-way proprietary broadband networks (digital cable networks). Viewers can also obtain video content via physical media such as videocassettes and DVDs.

Revenue from video delivery services and pricing of services is also collected in a number of ways. 'Free-to-air' broadcast RF signals are paid for by advertisers. Satellite and cable-based broadcast service providers charge a subscription and often 'bundle' a number of TV channels together. The consumer can opt for one or more such 'bundles'; choosing more channels is more expensive. 'Pay-per-view' pricing allows customers to selectively view premium content (movies, special sports events, etc.) for which viewing/descrambling is only enabled for a fee. Finally, 'video-on-demand' allows selected content to be delivered to viewers when they want it this may be priced as a monthly subscription or as a price per item. Although the latter is the more common delivery mode for video-on-demand today, this invention relates primarily to the delivery of content in a subscription model.

Three principal modes of content delivery exist: broadcast, multicast, and unicast. In the broadcast delivery mode, the content is sent to all viewers on the network and is often used in conjunction with some form of 'conditional access' at the customer end, which prevents them from accessing content they have not paid for, even if it has been physically received. In the multicast delivery mode, the content is sent to a set of viewers at the same time; for example is sent to all viewers who have requested a particular channel. In the unicast delivery mode, the content is sent to a particular viewer and is most often associated with 'video on demand' which enables a viewer to access any piece of content from a server, at any time.

Unicast delivery along with physical media distribution (videocassettes, DVDs), offer the viewer a high degree of control; the viewer can pause, rewind, or fast-forward the content. Over networks which are not capable of supporting unicast traffic, the convenience of this mode is simulated with 'Near Video-on-Demand' delivery mode, in which particularly desirable content (like recent movies) is presented on multiple channels with sequential start times, so that the viewer can choose the most convenient time from multiple start times.

One of the perceived virtues of television is that one does not have to engage proactively in choosing the content to be watched; you just turn the TV set on, and start surfing through the channels. However, this perception is slowly changing. At the subscriber site, the TV screen evolved from being only an entertainment screen to an interactive terminal through a programmable user-interface, commonly an infrared remote control, although infrequently a keyboard is also available.

To increase viewer's flexibility in choosing a specific content at a time if his/her liking, the modern set-top boxes are increasingly incorporating memory or hard disk storage that allows content to be recorded at one time and viewed at another time. The content information can be time-shifted, time-warped (for example to fast-forward through advertisements), and edited through recording equipment such as personal video recording (PVR) systems with built-in decoders. The recording of content information has also become user-programmable through on-screen electronic program guides; the viewer either enters a date, time and channel of the program desired to be recorded, or enters an identification code of the desired program. This features and the availability of a large local storage now allows broadcast networks to have some of the control advantages (pause, rewind, fast-forward) of unicast networks, with the notable precondition that the PVR must have first been programmed to save that content item in advance.

In most areas with cable or satellite TV, surfing for content has become increasingly unrewarding, since it has became increasingly difficult to decide which programs to watch and when. There are so many cable and satellite channels to surf through that it often takes too long for some viewers to find any content of interest; most viewers may not have the time to choose which programs they may or may not like, and to program a recording device which can record the programs that cannot be viewed at the time of broadcasting. The content search and programming tasks can take a considerable amount of time and are likely to cause many desirable programs to be overlooked. Even the electronic program guide has not substantially reduced the burden of this 'content search' task, since the viewer could be some time past the beginning of a selected program by the time he/she finds it among the hundreds of channels presented on the slowly scrolling program guide. So great is the quantity of information associated with displaying those hundreds of channels across multiple future time periods that the program guides are now compressed down to describing a content item in as little as 25 alphanumeric characters. This may not provide enough information for a viewer to decide if the content is interesting or not.

The cost (in time) to the viewer of searching for desirable content also exists in current 'video on demand' networks, where thousands of content items may exist on a server. Current trends are to an ever increasing number of broadcast channels and stored content items, making better means for finding desirable content ever more useful to customers.

Another disadvantage of the current status quo in the video entertainment field is that, if a viewer is not interested in a program that is currently playing on a broadcast channel, or is forced through a bundle to subscribe to a channel they are never interested in, then this creates a perception among customers that they are being forced to pay to receive content that they don't want.

With a mechanism to automatically determine accurately personal preferences of a viewer, a very personal TV viewing environment can be presented to the viewer. In case of households with multiple members, by correctly identifying individual members and their preferences, an apparatus can provide an entertainment experience which is most pleasurable to the individual viewer.

U.S. Patent Application 20030172378: "Method and apparatus for creating a personal commercials channel" describes a method and apparatus for providing a selected commercial to display on a video terminal. The method includes defining a viewer reference profile with respect to at least one descriptive attribute of a commercial. The viewer profile is then used to automatically select a 'personalized' commercial from a plurality of commercials stored in a database. A virtual channel is allocated from available channels in a channel list and the selected commercial is then associated with the virtual channel. The selected commercial is displayed when the virtual channel is accessed by the viewer.

However, this patent application does not disclose or suggest creating a sequence of program content for allowing the viewer to select the current program being displayed from that sequence.

U.S. Patent Application 20030067554 entitled "System and method for personalized TV" describes a personal TV system whereby a viewer receives a plurality of video segments constituting a TV program, information describing each segment, and controls with the description of each segment. Segments may be omitted or replaced with substitute segments. The viewer may review his preferences and edit or replace them. In a multi-viewer household, the system may prompt a viewer to confirm her/his preferences. When the viewer chooses to interact with a particular segment, the system automatically stores all subsequently received segments for later viewing while the viewer interacts with the selected segment. The system may also present TV program choices to the viewer selected and arranged in accordance with her/his preferences.

However, this Patent Application 20030067554 does not address the aspect of selecting video content from a database of stored video content, it rather addresses storing content selected according to viewer preferences for later viewing.

The ability to make video content personalized and convenient for viewers provides value to end customers, and differentiates unicast capable networks such as DSL relative to broadcast oriented networks like satellite.

SUMMARY OF THE INVENTION

It is an object of the invention to provide a personalized video entertainment system that alleviates totally or in part the drawbacks of the prior art video entertainment systems.

It is another object of the invention to provide a personalized video entertainment system that delivers video content via DSL access while giving viewers content selection choices that are meaningful to each viewer individually.

Accordingly, the invention provides a video server for enabling personalized entertainment on a video terminal, comprising: means for generating a viewer preference (VP) profile; means for constructing a personalized content sequence by selecting a plurality of eligible video content items from a plurality of video content items using the VP profile; a control unit for controlling selection and ordering of the plurality of eligible video content items within the personalized content sequence, and controlling transfer of a selected video content item of the personalized content sequence to the video terminal; a user interface for transmitting video content selection commands from the video terminal to the video server, transmitting the selected video content item from the video server to the video terminal and transmitting video content feedback messages to the video server; and an interface to a video content storage for storing the plurality of video content items and a content descriptor file associated with each video content items for describing the video content item.

The invention is also directed to a program controller for controlling access of a video terminal to a video server, comprising: an interactive user interface for selecting a preferred video content item from a preferred content sequence and controlling delivery of the preferred video content item on the video terminal; and an interface to the video terminal for enabling transmission and reception of commands and preference messages between the video terminal and the program controller.

The invention is further directed to a video system for provisioning personalized entertainment on a video terminal. The video system comprises a video storage for storing a plurality of video content items received from one or more video service providers and a content descriptor file associated with each the video content item; a video server for creating a personalized content sequence from the video content items, controlling access of the video terminal to the content sequence, and controlling storage and retrieval of the plurality of video content items to/from the video storage; and an access multiplexer with multiple ports, a port for connecting the video terminal to the video server over a local data network.

According to another aspect, the invention is directed to a method of providing personalized video entertainment on a plurality of video terminals connected to a video server storing a plurality of video content items. The method comprises generating a viewer preference (VP) profile for a video terminal; constructing a content sequence from eligible video content items identified using the VP profile; and controlling transfer of the eligible content items in the content sequence to the video terminal.

Still further, the invention defines a method of providing personalized video entertainment on a plurality of video terminals connected to a video server storing a plurality of video content items, comprising: generating a viewer preference (VP) profile for a video terminal; constructing a content sequence from eligible video content items identified by the VP profile; selecting a preferred video content item from the content sequence; and controlling transfer of the preferred video content item from the video server to the video terminal.

Advantageously, the invention enables viewing both an active (video on demand) and a passive (television) viewing experience using solely a unicast delivery from locally stored video content. Specifically, it allows the viewer a TV style 'channel switching' mode to access on-demand unicast delivered content. Because the number of content sequences is limited only by the size of the video storage, it is possible to deliver a very large number of 'channels'. Effectively the number of apparent 'channels' as experienced by the viewer is equal to the number of discrete pieces of content in the video storage, typically thousands. This allows DSL delivered video to compete favorably with HFC and satellite offerings which offer only a few hundreds of channels. If the video content storage is refreshed with new content sufficiently frequently, the number of 'virtual channels' perceived by the customer may be effectively infinite, because the content is being refreshed faster than they can view it.

Still another advantage of the invention is that even with an very large number of content items available, the system of the invention enables the viewer to easily select the items s/he is really interested in. Viewers are offered content choices that are of interest to them individually, and not bundles of channels, most of which may never carry any show of interest to the respective viewer. Broadcast suppliers of video content (i.e. cable and satellite TV operators) cannot easily provide now such personalized services.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
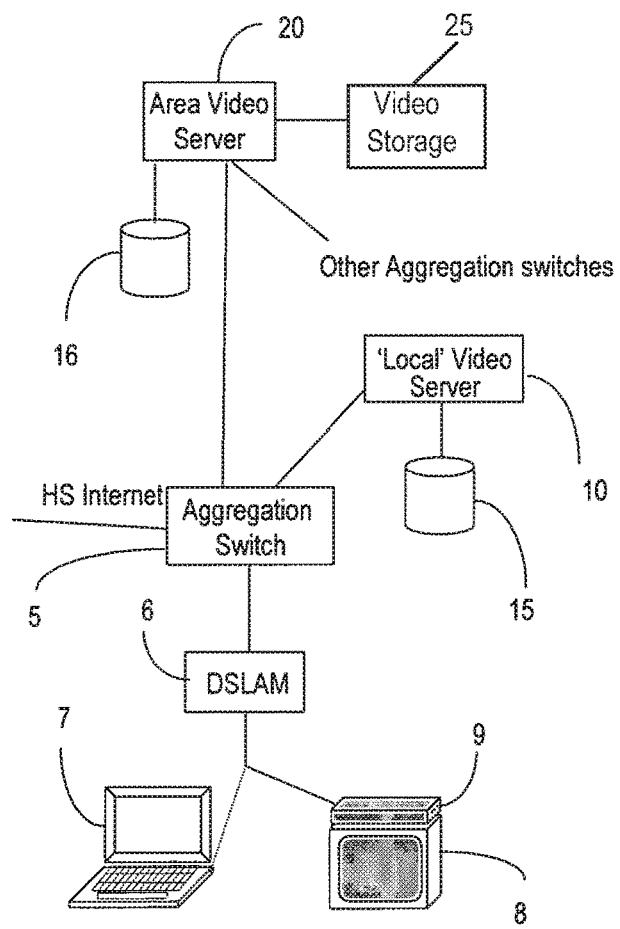
FIG. 1 illustrates a block diagram of one embodiment of the personalized video entertainment system of the invention.

FIG. 1 illustrates a block diagram of one embodiment of the personalized video entertainment system of the invention. As shown, the TV programs are stored on a local video server 10 equipped with a video storage 15. This video server controls and monitors content delivered by, and content refreshed from an upstream network, not shown. An 'area' video server 20 with a video storage 25 may be located more centrally in the network; this may be used to source less frequently accessed content. One or more content sequences are created for each viewer according to the respective viewer's preferences, matched with the video content which exists in the video storage. The viewer's preferences may be specified by the viewer, or deduced from viewer behavior and other knowledge. A content sequence is therefore similar to an index of content items that will be shown on a viewer-customized 'channel'. The video content specified by the content sequence is delivered to the viewer from the video content storage under viewer control, whereby the viewer can select which piece of content in the sequence s/he wishes to view currently, pause an item, skip an item, and perform other actions to control the content delivery.

As seen on FIG. 1, the viewer may use a video terminal connected to a local data network, shown here as a DSL (digital subscriber line) communication network. The video terminal may be a computer 7, or a TV set 8 with a set top device 9, for converting the encoded video signal into a form suitable for display on a TV set. Other video terminals may also be used, the invention is not limited to video terminals such as 7 or 8 and 9. A DSL access multiplexer (DSLAM) 6, which is typically located at a central office of the telephone network and includes multiple DSL modem ports for connecting multiple client modems, connects the viewer video terminal to an aggregation switch 5, connected over a high-speed connection.

It is to be noted that the video programs may be received at servers 10 and 20 via one or more of satellite transmission, cable broadcast transmission, private data networks or the Internet. Each content item has in general three separate components; the video and audio file of the content item itself, a machine searchable content descriptor file, and a shorter video and audio 'preview' file'. The content descriptor file is key to the personalization of this invention, as the match between the content in this content descriptor file and the personal preferences profile of an individual viewer results in a content item being selected for inclusion in viewer's content sequence.

Figure 2:
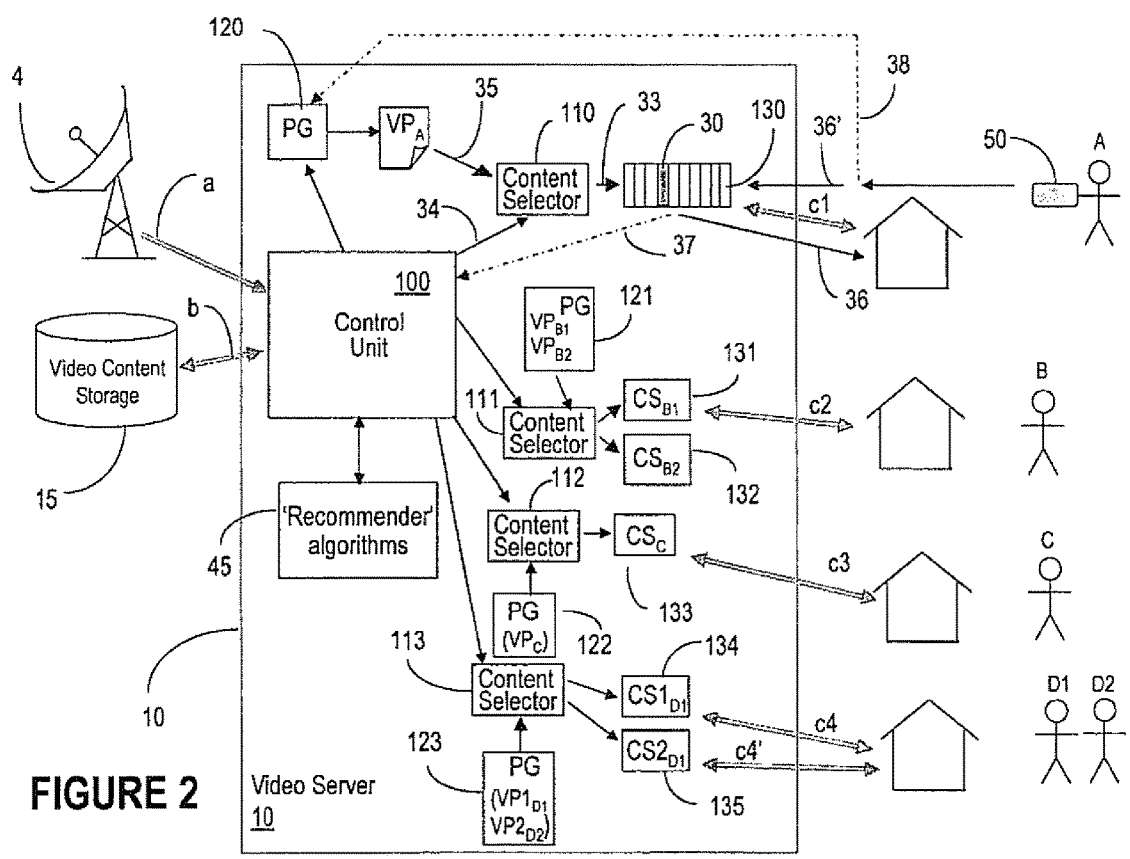
FIG. 2 shows an example of how the video content storage may be managed.

FIG. 2 shows an example of how the video content storage may be managed. As seen in FIG. 2, server 10 provides personalized viewing to viewers A-C, D1 and D2; it is to be understood that the number of viewers served by a local video server may vary according to the density of the subscribers in a respective area and also according to the capacity of video storage 15 and the capacity of the network between the viewer and the video store. The TV programs are stored on video content storage 15 as received from antenna 4 (or cable, etc), and could simply be broadcast content which has been captured and stored as per a 'Delay TV' model. In the 'Delay TV' model, normal broadcast programs are captured and stored on a server, and any program that has recently been broadcast can be obtained at any time. This is simply a different way of putting content into the video storage.

Server 10 includes a control unit 100 that interfaces with the content source 4 over an interface a, with video content storage 15 over an interface b and with viewer terminals over a respective interface c1-c4. Interface a performs format conversion for the signals received from the content source 4 into a data format, bidirectional interface b manages access of control unit 100 to video content storage 15 for writing/reading data, and each interface c1-c4 performs format conversion of the signals transmitted by video server 10 to the respective viewer terminal. Interfaces c1-c4 are shown as bidirectional, since they also enable the viewer to transmit commands to server 10. These commands are generated using a program controller 50, which is usually a handheld remote in the case of a TV terminal, or a keyboard/mouse (not shown) in the case of a computer and monitor used as video terminal.

The interfaces may also be responsible for analog to digital conversion, decoding, encoding, trans-coding (change of video encoding methods), or trans-rating (change of video signal rate) as necessary according to the type of signal received and transmitted.

As mentioned, the video content store 15 contains two types of data; the first is the content item itself, say a movie, and the other is preview information about the content item, which might include for example the title, a synopsis of the plot, the genre to which it belongs, the actors and director, the item's popularity, the critics appraisal of the item, the length of the item, the item's age appropriateness rating, when the item was produced, when the item became available on this video distribution system, and how many times in each historical time period this item has been viewed by viewers. A video preview may optionally also be stored in association with a content item.

According to the invention, profile generators 120-123, provided on server 10, generate a set of criteria by which content items will be selected; this set of criteria are known as viewer preference (VP) profiles $VP_A$, $VP_{B1}$, $VP_{B2}$, $VP_C$, $VP_{D1}$, $VP_{D2}$. FIG. 2 shows profile generator 120 for viewer A and the viewer profile $VP_A$ generated by the respective profile generator 120 as separate entities; the profile generator 120 and viewer profiles for the remaining viewers are shown as one unit. It is to be noted that a unique profile generator may be used for generating the profiles for all viewers. Alternatively, individual profile generators 120-123 may be used for each household, or for a group of households, etc.

Besides viewer preferences, the VP profiles may also maintain the security profile data for the respective viewer. The service provider may also allow the content items to be classified into tiers or sets, where viewers may select a wider, more recent, or high quality content for a premium price. The set of content to which the viewer has paid access rights is also stored in the viewer's profile.

Control unit 100 operates a plurality of content selectors 110-113 to filter and sort the video content items from the content storage 15 according to the viewer preference profiles $VP_A$, $VP_{B1}$, etc. Each content selector unit 110-113 constructs a viewer specific index into the content on the server called herein a content sequence (CS) 130-135, to be streamed to the viewer. The selectors then generate, under viewer control, the stream of video to be delivered to an individual video terminal. The content sequence is perceived by the viewer as a 'channel', with the difference that the viewer can browse forward and backward to access any item within this content sequence and is not restricted (as in a broadcast channel model) to viewing only the information currently received. Furthermore, once the viewer has selected a desirable content item, he/she has full local control over its' play-out; starting from the beginning, whenever the viewer wants, pause, rewind, and so forth. In this example, viewer A watches currently the content denoted with 30 in content sequence 130.

Alternatively, the content sequence maintained by video server 10 may be assembled into non-viewer specific content sequences typically using entertainment specialists, for example to create a "popular choice" content sequence, a "sports highlights" content sequence, a "critics choice" content sequence or a "romantic evening" content sequence. In this alternative, all subscribers to the services offered by video server 10 have access to all content sequence selections.

A mix of the two mechanisms described in the two previous paragraphs is also possible, wherein a list of content selected by a viewer to match a particular genre, is then personalized by application of algorithms that prune out content items that would be undesirable to that viewer, and prioritize items which will be a good fit for that viewer.

In the embodiment shown in FIG. 2, video server 10 uses a number of algorithms, which recommend a desirable content sequence for each particular viewer, as shown generically by a recommender unit 45. The algorithms employed by the recommender unit 45 use the information about the viewer from the viewer preference profile, and the information about the possible content items from the content descriptor data in the video content storage. Such algorithms could be for example based on machine learning algorithms, pattern matching, or "fuzzy retrieval" algorithms, genetic algorithms, collaborative filtering, Bayesian categorization, Pareto accumulation of preferences, Lexicographical prioritization, and weighted attribute ranking. The recommender unit 45 may also take into account the reputation or reliability of assessments from viewers, or incorporate external data such as critics' appraisals, or popularity metrics such as movie box office take, in its decision criteria.

One such algorithm employed by the video server is "preference similarity", whereby the server "learns" which customers are most similar to each other in viewing preferences and uses the feedback information from similar customers to improve the content scheduling for other customers. For example if the customers who seem most similar to a particular customer in viewing preference all liked a particular content item, this content item will be proposed to the particular customer in his/her content sequence. Other methods of determining desirable content include "expertise" based recommendations, and "demographic similarity" based recommendations; for example to note that films recommended by teenage girls may be of interest to other teenage girls. These mechanisms may also be combined, for example to infer from past viewing behavior that the preferences of a viewer are similar to those of teenage girls and that therefore the content liked by teenage girls is likely to be of interest.

The VP profiles are updated automatically, or at preset intervals, so that the mix of content in the content sequence gets better and better tailored to the current preferences for the respective viewer. Updates are also provided when the algorithms used by recommender unit 45 are upgraded or new algorithms are installed. Since the personal profile also stores the identity of the specific content accessed and date/time viewed, it can be easily set to ensure that the viewer never sees a repeat of a piece of content unless they have requested it, or it is only allowed into the content sequence until some period of time has elapsed since the time it was last viewed.

A viewer may prefer to see all the content s/he is entitled to within one content sequence, or may prefer to have the option of accessing any one of a number of content sequences, depending on their mood or interests at the time. FIG. 2 shows various scenarios of content sequence per viewer combinations. Thus, the content sequence 130 for subscriber A comprises all the content selected from the video content storage 15 based on the viewer preference profile $VP_A$ generated by profile generator 120. Subscriber B will have created for her two content sequences, namely $CS_{B1}$ 131 with the sports games, as selected by content selector 111, based on the viewer preference profile $VP_{B1}$, and $CS_{B2}$ 132 with the dramas, selected based on viewer preference profile $VP_{B2}$. The content sequence $CS_C$ 133 for subscriber C includes all the movies available in the video content storage 15 that have been selected by content selector 113 based on viewer preferences profile $VP_C$.

Multiple viewers per household are also possible, as shown on FIG. 2 for viewers D1 and D2, whereby each viewer in the same household may have a different profile, as shown at $VP1_{D1}$ and $VP2_{D2}$. Viewers D1 and D2 will each have a content sequence $CS_{D1}$ 134 and respectively $CS_{D2}$ 135, each including the content selected by 'content selector' 113 for these viewers, based on the respective profiles $VP1_{D1}$ and $VP2_{D2}$. On networks that allow multiple simultaneous streams, viewers D1 and D2 could each watch their own customized content sequences on different terminals simultaneously (two interfaces c4 and c4'). On a network supporting only single video streams per household, the viewer will use the program controller device 50 to signal to the video server 10 to indicate which viewer's profile is to be active at that point in time. Not shown on FIG. 2 is a further option, where by associating multiple video viewers simultaneously with a single video terminal, a content sequence can be constructed which reflects the joint preferences of all the viewers present.

Figure 3:
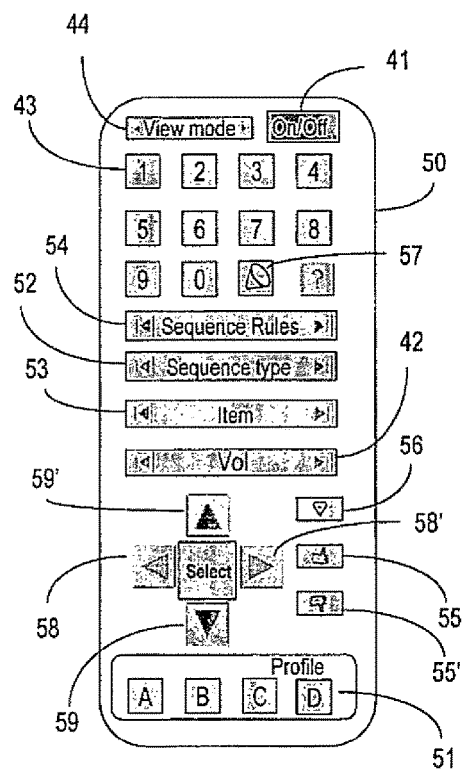
FIG. 3 shows an example of a program controller according to an embodiment of the invention.

FIG. 3 shows an embodiment of the program controller device 50. It is understood that while this program controller device 50 is shown as a remote unit having physically separate buttons for each function, this is open to a variety of implementations, such as selection of menu items from a programmable display menu using only a few "navigate", "select", and "back" buttons. Thus, the program controller may be embodied as a stand-alone device 50 (similar to a remote controller), or may be integrated with the video terminal, or may be provided as a screen displayed by the video terminal 7, 8. It is also to be noted that a program controller device 50 may be implemented in the case of a computer based video terminal by standard input output devices such as a keyboard and mouse to indicate viewer preferences.

As such, term "button" is used here in a broad sense, (it includes e.g. "key", "command", "control", etc.); this term is intended to designate a means for enabling a viewer interaction (e.g. selection of a menu/action, transmission of a command, etc.) with the server.

Further, if the program controller is implemented in part or in whole as a programmed interface, this may allow for very sophisticated features to be introduced without complexity to the user. For example, a simple remote with a bidirectional communication link to the video terminal could be used for all standard selection and play-out control tasks, in combination with a completely separate web-based interface used to enter via a computer keyboard viewer preference profile data or provide detailed feedback on attributes like or disliked about a recently viewed content item.

It is understood that the operation of the program controller especially when implemented a remote unit, will in general be combined with that of the video terminal. That is, the description that follows will represent the program controller as directly communicating with the video server. In practice the program controller implemented as a remote will simply communicate buttons pressed or menu choices selected, typically via an infrared or wireless link, to a "set-top box", which then relays the messages on to the video server. In this case, the video terminal comprise a "set-top box" for decoding the video content, relaying messages from the remote, and other functions, and a television set or computer and monitor for displaying the video content.

Program controller device 50 shown here in a representative remote unit configuration, has a plurality of general purpose buttons for enabling basic functions such as button 41 for switching the video terminal on/off, button 42 for adjusting the volume, an alphanumeric keypad 43 for enabling communication with server 10, and to perform other well known functions. It is to be noted that other general purpose controls may be provided on program controller device 50 (e.g. TV/VCR/CDR mode selection etc.), the invention describes the most important ones only.

In addition to this general purpose buttons, the program selector comprises a set of content selection buttons, which enable viewer interaction with the server for accessing the content sequence and the preferred content item in that sequence. Thus, once a screen as seen in FIG. 4b is displayed on the video terminal 7 or 8 (see FIG. 1), program controller device 50 enables the viewer to select the active profile using control button 'profile' 51 (i.e. the profile for viewer D1 or D2), the content sequence type if the viewer subscribed to more than one, using control button "sequence type" 52, and to browse for content 30 within that profile using control button 53, "item". For example, viewer B may select $CS_{B1}$ or $CS_{B2}$ using "sequence type" button 52, while "item" button 53 will enable her to browse $CS_{B1}$ for an item of interest. By pressing the "forward" end on "item" command 53, the system simply skips to the next item in the respective content sequence. Similarly, pressing the "back" end on "item" command 53, takes the viewer back to the previous content. Controls 52, 53 may also be provided as four separate buttons, or positioned differently than in FIG. 3, as desired.

Control buttons 53, 52 may also be used for enabling further granularity to the content selection. Thus, controls 53 may for example enable selecting the content item while controls 52 may enable selection of the genre (News, Comedy, Drama, Soaps, Favorites). An electronic program guide can also be used in conjunction with this content selection model; the viewer can browse a program guide for the content sequences s/he is authorized to view.

Still further, program controller 50 enables the viewer not only to apply content selection criteria but also to actively communicate his/her feedback to the server 10, for updating/upgrading the respective viewer preference profiles $VP_A$, etc. Thus, program controller device 50 enables the viewer to express his/her like or dislike of the content 30, using an approval button 55 ("thumbs up"), a disapproval button 55' ('thumbs down'), a "favorite" button 56 and/or "feedback" button 57. The "feedback" button 57 may be used in combination with answers to some questions that the viewer may respond using control buttons 58, 58', 59, 59'. This more detailed opinion about the content items will enable server 10 to better specify viewer preferences.

Other specific controls are enabled by the present invention, and they may also be provided on program controller device 50. For example the order of items in the content sequence may be determined by settings in the VP list, or may be proactively set by the viewer. The rules by which content is ordered in the sequence may be based on a variety of criteria, such as the time of arrival of the item (e.g. "newest" content first), or according to a preference score for that viewer (e.g. "best" content first), or in random sequence; server 10 may use other criteria for arranging the items in the content sequence. However, the viewer may change the item order at the server 10 through a "Sequence Rules" button 54.

As well, the viewer may be enabled with searching facilities, based on alphanumeric characters on keypad 43 (e.g. title of the show, actor names), or other criteria to allow the viewer to select content directly from the content storage in a "Video on Demand" mode for example using a "View Mode" button 44. In addition, the server 10 and the viewers may also communicate using more complex alphanumeric messages as the technology progresses.

Figure 4A:
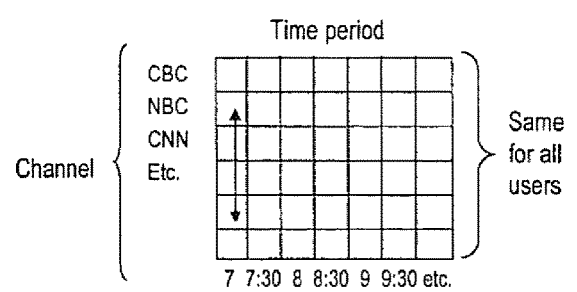
FIG. 4a shows an example of a screen for a broadcast media electronic program guide, used currently for show selection.
Figure 4B:
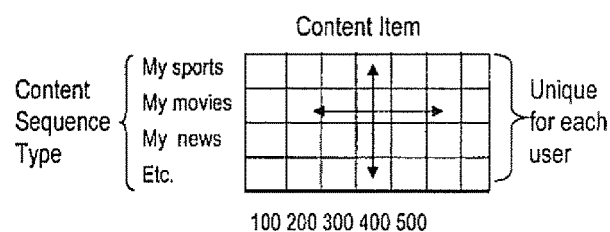
FIG. 4b is an example of a screen for an electronic program guide relating to the content organized as per this invention.

FIG. 4a shows the electronic program guide layout as it exists for standard broadcast media, with channels in rows, and time periods in columns.

FIG. 4b shows the electronic program guide for the selection mechanism as described in this invention, with a small number of alternative content sequences. In this example, the content sequence types are defined as "My Sports", "My Movies" and arranged in rows and the content items denoted with 100, 200, 300, 400, 500, etc. are arranged in columns. If the layout of FIG. 3 is used, the browsing in this program guide is performed using command buttons 52 and 53. Unlike the 'one dimensional' selection that exists in the broadcast electronic program guide of FIG. 4a where the viewer cannot choose to be at any time other than "now", the electronic program guide of FIG. 4b allows "two dimensional" selection of any item from any content sequence. Furthermore, the ability to browse forward and backward among content items is limited only by the size of the video content store, and every item when selected starts its program content from the beginning at the point in time when it is selected.

Because the content has been selected based on viewer specific criteria, the amount of information displayed on this new electronic program guide per FIG. 4*b* is both easier to navigate and more relevant to the viewer. The video content item which is currently selected can always be paused, rewound, fast forwarded, while in progress, or skipped.

The operation of the video server 10 is described next for viewer A (see FIG. 2). Let's assume that the viewer preferences profile VP$_A$ has been created, and that the content sequence 130 has been constructed, as shown by arrow 33, by filtering the content received from control unit 100, as shown by arrow 34, based on profile VP$_A$, as shown by arrow 35. Viewer A turns "on" the video terminal (button 41) and, on a screen as shown in FIG. 4*b*, selects the content 30 of his liking for the current viewing, as shown by arrow 36. The access of a viewer A to the content sequence 130 may be enabled by use of a PIN number using the keypad 43. Alternatively, server 10 may be designed to send automatically to a viewer only the video content associated with that authenticated viewer, upon switching "on" the video terminal.

Once a content item has been selected, control unit 100 may either start to stream the content to the viewer immediately, or, for more convenient content assessment, a brief preview of the respective content that summarizes the critical information about the content may be first displayed. The viewer presented with this information can either continue to "browse" along the content sequence, or do nothing and the content will start to stream. At the end of that content sequence, again a brief synopsis of the upcoming content item will allow the viewer to skip over or not, as desired. On the other hand, if the viewer decides to do nothing (no selection/browsing) the items in the content sequence 120 are streamed to the customer, just like a TV channel: when one program ends, another starts automatically.

As indicated above, the profile generator 120 generates VP$_A$ with the viewer preference information using the algorithms of recommender unit 45 and the viewer feedback. Viewer feedback may be obtained from entry by the viewer (first option), or by statistical observation at control unit 100 of the viewing habits (second option).

According to the invention, the first viewer feedback option may be provided in a number of ways. For example, the viewer may indicate their likes and dislikes of the content to the profile generator 120 using the viewer preference buttons on program controller 50, as shown by arrow 36'. Thus, the viewer may press 'thumbs up' and 'thumbs down' buttons 55 and 55', to provide immediate viewer feedback about the content in progress or just completed. Viewer A may also use the "feedback" button 57 eg. to signal that s/he disliked a content item because it was too violent. The "feedback" button 57 when used in combination with answers keypad 58, 58', 59, and 59', provides server 10 with more explicit information, which can be used to better configure content selector 110 to include or exclude content items based on detailed attributes, eg. to filter out violent content items. At the other end of the spectrum, viewer A may depress button 56 to signal that the content item was so good that they want it saved to a "favorites" content sequence, which is made up exclusively of content the viewer has identified as favorites. It may also be possible for a viewer to directly modify their profile via the Internet (not shown).

A viewer may also actively update his/her VP list, as shown by dotted arrow 38. For example, viewer A may change preferences list 120 if a specific control (not shown) is provided on program controller device 50 for this operation. Preferably, access to the VP lists is password enabled for restricting access to authorized persons only.

According to the second viewer feedback option, statistical observation of viewing preferences may be communicated to control unit 100 based on the viewing patterns for the respective viewer, as per the content selection behavior. Thus, if a viewer watches an item all the way through, this can generally interpreted as more positive than if s/he watched for a few minutes and then skipped to the next content item. A command from the viewer to change to a new content item via program controller device 50, not only changes the active content item 30 within the content sequence 130, but also records this change in the viewer profile VP$_A$, which will have an influence on how the content sequence is constructed later by the content selector 110.

The feedback from viewers is also collected automatically by control unit 100, to influence the changing of content on the video content storage unit 15. For example, the content which is either rarely selected by viewers, or which viewers have provided direct or inferred feedback that they disliked might be 'pruned' to free up space on the storage unit for new content which may be more desirable to the viewers associated with this video server.

What is claimed is:

1. A method of providing personalized video entertainment on a plurality of video terminals connected to a video server storing a plurality of video content items, the method comprising:
   generating a viewer preference (VP) profile for a video terminal based on statistical observation of viewing habits;
   collecting viewer preference information relevant to said video terminal;
   constructing a content sequence from eligible video content items identified using said VP profile;
   preparing a collection of selection criteria for identifying the eligible video content items associated with the video terminal, wherein the collection of selection criteria includes reliability factors that take into account quality of viewer feedback messages;
   storing the selection criteria in the VP profile; and
   controlling transfer of said eligible content items in said content sequence to said video terminal.

2. The method of claim 1, wherein said step of controlling further comprises:
   viewing video content items in said content sequence in a successive order provided by said video server, or in a preferred order selected at said video terminal.

3. The method of claim 1, wherein said step of constructing further comprises:
   preparing a set of content sequences for said video terminal, each content sequence comprising video content items of a genre specified in said VP profile.

4. The method of claim 1, wherein said step of constructing further comprises:
   applying a selection algorithm to said plurality of video content items based on said VP profile.

5. The method of claim 4, wherein said selection algorithm includes is one of a group of machine learning algorithms, pattern matching algorithms, fuzzy retrieval algorithms, genetic algorithms, collaborative filtering algorithms, Bayesian categorization algorithms, Pareto accumulation of preferences algorithms, Lexicographical prioritization algorithms, and weighted attribute ranking algorithms.

6. The method of claim 1, wherein said step of controlling further comprises:
   viewing said preferred video content item at a regular speed;
   scrolling back and forth within said preferred video content item; and
   temporarily stopping viewing of said item of interest or canceling viewing of said item of interest.

7. The method of claim 1, further comprising:
   updating said viewer preference profile based on viewer feedback data transmitted from said video terminal to said video server.

8. The method of claim 7, wherein said step of updating further comprises:
   collecting said viewer feedback data received from said video terminal; and
   applying a selection algorithm for updating said VP profile based on said viewer feedback data.

9. The method of claim 8, wherein said viewer feedback data is directly entered from said video terminal into said viewer preference profile.

10. The method of claim 8, wherein said step of collecting said viewer feedback data is automatically performed at said server based on viewing patterns detected at said video server.

11. A method of providing personalized video entertainment on a plurality of video terminals connected to a video server storing a plurality of video content items, the method comprising:
   generating a viewer preference (VP) profile for a video terminal based on statistical observation of viewing habits;
   collecting viewer preference information relevant to said video terminal
   constructing a content sequence from eligible video content items identified by said VP profile;
   preparing a collection of selection criteria for identifying the eligible video content items associated with the video terminal, wherein the collection of selection criteria includes reliability factors that take into account quality of viewer feedback messages;
   storing the selection criteria in the VP profile;
   selecting a preferred video content item from said content sequence; and
   controlling transfer of said preferred video content item from said video server to said video terminal.

12. The method of claim 11, wherein said step of selecting further comprises:
   selecting a preferred content sequence from said content sequence for said video terminal; and
   then selecting said preferred video content item from said content sequence.

13. The method of claim 11, wherein said step of selecting further comprises:
   displaying on said video terminal a screen showing along one orthogonal axis all content sequences of a set and on a second orthogonal axis all content items in each said content sequence;
   browsing said screen for uncovering said preferred video content item; and
   transmitting the identity of said preferred video content item to said video server.

14. The method of claim 11, wherein said step of selecting further comprises:
   displaying on said video terminal a screen showing said content sequence; and
   then browsing through all video content items in said content sequence.

15. The method of claim 14, wherein said step of selecting further comprises:
   searching said content sequence based on user defined search criteria for locating said preferred video content item.

16. A method of providing personalized video entertainment on a plurality of video terminals connected to a video server storing a plurality of video content items, the method comprising:
   generating a viewer preference (VP) profile for a video terminal based on statistical observation of viewing habits;
   collecting viewer preference information relevant to said video terminal;
   constructing a content sequence from eligible video content items identified using said VP profile;
   preparing a collection of selection criteria for identifying the eligible video content items associated with the video terminal, wherein the collection of selection criteria includes external content item data appraisals and popularity metrics;
   storing the selection criteria in the VP profile; and
   controlling transfer of said eligible content items in said content sequence to said video terminal.

* * * * *